United States Patent
Beaver et al.

(10) Patent No.: US 12,370,982 B2
(45) Date of Patent: Jul. 29, 2025

(54) STABILIZER TO SUPPORT AN OBJECT

(71) Applicant: ETN Capital, LLC, Sanford, NC (US)

(72) Inventors: Ryan Beaver, Richmond, VA (US); William Myles Riley, Richmond, VA (US); Paul G. Rockwell, Midlothian, VA (US)

(73) Assignee: ETN Capital, LLC, Sanford, NC (US)

( * ) Notice: Subject to any disclaimer, the term of this patent is extended or adjusted under 35 U.S.C. 154(b) by 585 days.

(21) Appl. No.: 17/711,300

(22) Filed: Apr. 1, 2022

(65) Prior Publication Data

US 2023/0311819 A1    Oct. 5, 2023

(51) Int. Cl.
*B60S 9/04*    (2006.01)

(52) U.S. Cl.
CPC ....................................... *B60S 9/04* (2013.01)

(58) Field of Classification Search
CPC .... B60S 9/04; B25H 1/06; E04G 1/28; E04G 1/32; E04G 1/34; F16M 11/22
USPC .................... 248/188.91, 351–362; 269/901; 182/181.1, 186.5, 182.1–182.5, 183.1, 182/225
See application file for complete search history.

(56) References Cited

U.S. PATENT DOCUMENTS

| | | | | |
|---|---|---|---|---|
| 598,100 | A * | 2/1898 | Kaganovsky | B25H 1/06 182/182.3 |
| 1,103,699 | A * | 7/1914 | South | B25H 1/06 182/155 |
| 3,722,621 | A * | 3/1973 | Jones | E04G 1/34 182/152 |
| 4,489,808 | A * | 12/1984 | Voye | B25H 1/06 182/155 |
| 5,113,920 | A * | 5/1992 | Sedeniussen | B25H 1/04 144/287 |
| 7,172,053 | B2 * | 2/2007 | Slavich | B25H 1/16 182/153 |
| 2014/0131541 | A1 * | 5/2014 | Polzen | E06C 7/423 248/351 |

OTHER PUBLICATIONS

Valterra Products, "RV Stabilizer, 14"-28" Universal, Boxed", Retrieved from the internet: URL: https://www.valterra.com/product/rv-stabilizer-14-28-universal-boxed/ [retrieved on Feb. 3, 2022], pp. 1-3.

* cited by examiner

*Primary Examiner* — Christopher Garft
(74) *Attorney, Agent, or Firm* — COATS & BENNETT, PLLC

(57) ABSTRACT

A stabilizer to support an object. The stabilizer includes a beam with a contact surface to contact against the object. The stabilizer also includes legs that extend from the beam and contact against a floor. The beam is divided into two sections that are connected together with a bracket. The two-piece beam provides for the stabilizer to fold together in a closed orientation to facilitate storage.

18 Claims, 6 Drawing Sheets

STABILIZER TO SUPPORT AN OBJECT

BACKGROUND

Stabilizers are devices used to support an object. The stabilizers generally include a surface that contacts the object and one or more supports that extend from the surface to the floor. The devices can be used to support a variety of different objects. One example includes a recreational vehicle such as a camper or a pop-up tent that is being parked at a campground. Other examples include but are not limited to car while a tire is removed, or a house while a foundation piling is being reset. The devices can be used to support an object for a relatively short time (e.g., 30 minutes while a flat tire is being repaired) or for a longer time (e.g., weeks while a house foundation is being reset).

The devices are designed to support the weight of the object. A downside to this is that the stabilizers are often large in size. This size makes the stabilizers difficult to store when not in use. For example, a stabilizer that is used to support a recreational vehicle may be stored in the vehicle when not in use. The large size makes storage difficult as there is limited space in a recreational vehicle and the existing space may not be adequate to house the device when not in use.

SUMMARY

One aspect is directed to a stabilizer to support an object above a floor. The stabilizer comprises a bracket. A first beam section comprises an inner end, an outer end, and a top side with the first beam section connected to a first side of the bracket at the inner end. A second beam section comprises an inner end, an outer end, and a top side with the second beam section connected to a second side of the bracket at the inner end. A first leg is connected to the first beam section at the outer end. A second leg is connected to the second beam section at the outer end. The first beam section and the second beam section are pivotally connected to the bracket and movable between an open orientation and a closed orientation. The open orientation comprises the first beam section and the second beam section aligned in an end-to-end alignment and with the inner ends spaced apart by a gap. The closed orientation comprises the first and second beam sections folded together about the bracket.

In another aspect, the stabilizer is symmetrical about a center plane that extends through the bracket and is perpendicular to the top sides of the first and second beam sections in the open orientation.

In another aspect, the first beam section and the second beam section are identical in shape and size.

In another aspect, the bracket comprises a central body that is aligned with the gap and wings that extend outward from the central body and are connected to each of the first beam section and the second beam section.

In another aspect, the top sides of the first beam section and the second beam section are aligned in a common plane in the open orientation.

One aspect is directed to a stabilizer to support an object above a floor. The stabilizer comprises a first section and a second section each comprising: a beam section an inner end, an opposing outer end, a top side, and a bottom side; a leg pivotally connected at the bottom side of the beam section in proximity to the outer end; a bracket connected at the bottom side of each of the beam sections at the inner ends with the bracket comprising a central body at the inner ends and wings that connect to each of the beam sections. The first and second sections are configured to move between an open orientation and a closed orientation. The open orientation comprises the beam sections positioned in an end-to-end alignment with the top sides aligned in a plane and with the legs extending from the bottom sides away from the beam sections. The closed orientation comprises the beam section and the leg of the first section folded together and the beam section and the leg of the second section folded together and with the first and second sections folded together about the bracket and with the top sides parallel.

In another aspect, in the open orientation the bracket spaces apart the inner ends of the beam sections by a gap.

In another aspect, the first and second sections are symmetrical about a center plane that extends through the gap when the first and second sections are in the open orientation.

In another aspect, each of the first and second beam sections comprise ribs on the bottom side with the ribs extending along a length of the beam sections between the first ends and the second ends.

In another aspect, the wings of the bracket are connected to the ribs of the beam sections and with the wings positioned away from the top sides.

In another aspect, the legs are connected to the beam sections at the ribs and are positioned away from the top sides to provide for the first and second sections to pivot between the open and closed orientations.

In another aspect, the ribs extend an entirety of the length of the beam sections.

In another aspect, each of the first and second sections further comprise a foot pivotally connected to the leg at an opposing end away from the top brace with the foot of the first section is pivotally connected to the leg of the first second and the foot of the second section is pivotally connected to the leg of the second section and with the feet folded inward against the legs in the closed orientation.

In another aspect, the bracket is positioned an equal distance from each of the legs.

One aspect is directed to a method of supporting an object above a floor with a stabilizer. The method comprises: pivoting a first beam section relative to a second beam section about a bracket that is connected to inner ends of each of the first beam section and the second beam section; aligning the first beam section and the second beam section in an open orientation with an end-to-end alignment with the bracket at a central point between the first beam section and the second beam section; extending a first leg outward from the first beam section; extending a second leg outward from the second beam section; pivoting at least one of the legs inward; and simultaneously contacting each of the first and second beam sections against the object while in the open orientation and the first leg and the second leg against the floor.

In another aspect, the method further comprises spacing apart inner ends of the first and second beam sections with a gap in the open orientation.

In another aspect, the method further comprises aligning top sides of the first and second beam sections in a common plane in the open orientation.

In another aspect, the method further comprises folding the first beam section and the second beam section relative to one another at the bracket to a closed orientation.

In another aspect, the method further comprises positioning top sides of the first and second beam sections parallel to each other in the closed orientation.

The features, functions and advantages that have been discussed can be achieved independently in various aspects or may be combined in yet other aspects, further details of which can be seen with reference to the following description and the drawings.

DETAILED DESCRIPTION

The present application is directed to a stabilizer to support an object. The stabilizer includes a beam with a contact surface to contact against the object. The stabilizer also includes legs that extend from the beam and contact against a floor. The beam is divided into two sections that are connected together with a bracket. The two-piece beam provides for the stabilizer to fold together in a closed orientation to facilitate storage.

Figure 1:
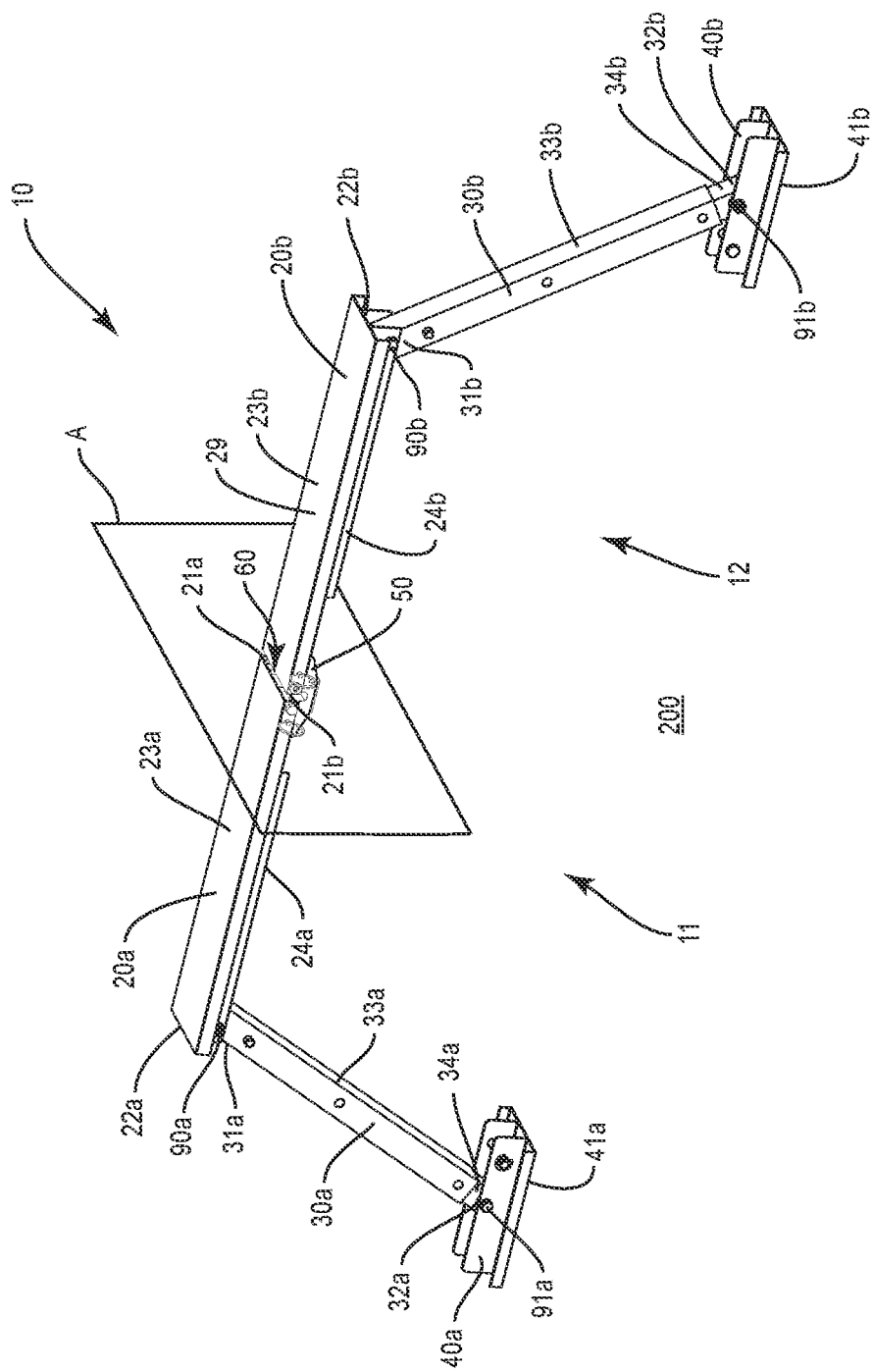
FIG. 1 is a perspective view of a stabilizer in an open orientation.

FIG. 1 illustrates a stabilizer 10 in an open orientation. The stabilizer 10 includes a beam 29 with a support surface configured to contact against an object. Legs 30a, 30b extend outward from the beam 29 to contact against a floor 200. The beam 29 is divided into a first beam section 20a and a second beam section 20b. A bracket 50 connects the beam sections 20a, 20b together.

The stabilizer 10 is divided about a central plane A into two assemblies 11, 12. The first assembly 11 includes the first beam section 20a and the first leg 30a. The second assembly 12 includes the second beam section 20b and the second leg 30b. In one example, the two assemblies 11, 12 are identical in shape and size with the stabilizer 10 symmetrical about the center plane A that extends through and divides the bracket 50. The symmetrical design facilitates manufacturing and assembly as it reduces the number of different components. Each of the beam sections 20a, 20b are the same, as well as each of the legs 30a, 30b being the same. In one example, the bracket 50 is also symmetrical about the center plane A. In another example, the bracket 50 is symmetrical except for one or more apertures on one side of the bracket 50 that are not on the opposing side.

Figure 2:
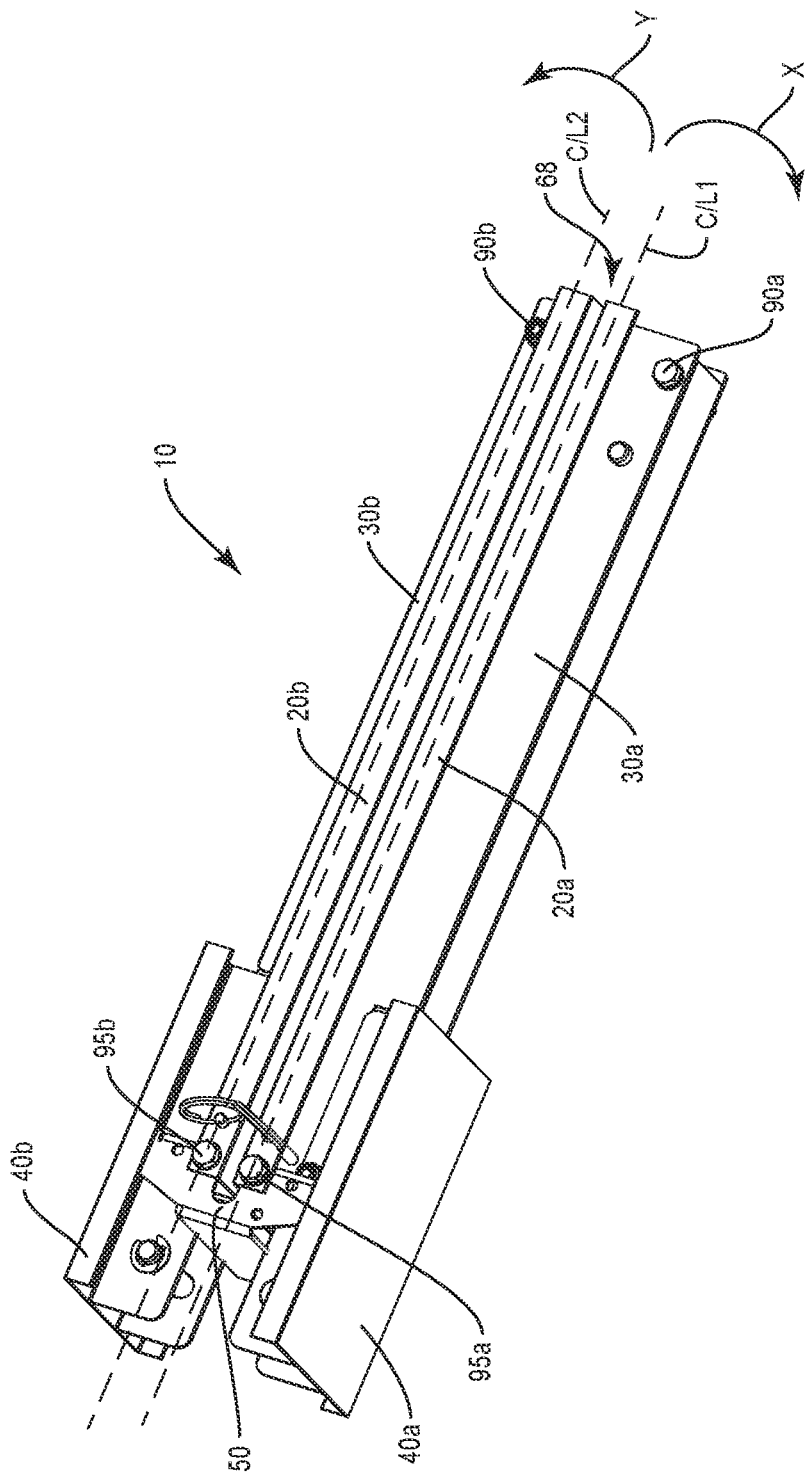
FIG. 2 is a perspective view of a stabilizer in a closed orientation.

The stabilizer 10 is movable between the open position as illustrated in FIG. 1 and a closed orientation as illustrated in FIG. 2. In the open orientation, the beam sections 20a, 20b are aligned in an end-to-end alignment to contact against and support an object. In the open orientation, the stabilizer 10 occupies a first amount of space. In the closed orientation, the beam sections 20a, 20b and legs 30a, 30b are folded together. The closed orientation occupies a second smaller amount of space and facilitates storage. In one example in which the stabilizer 10 is used for supporting a recreational vehicle, the reduced size facilitates storing the stabilizer 10 in the interior of the recreational vehicle.

The bracket 50 is positioned at a longitudinal center of the stabilizer 10 in the open orientation. In the open orientation, the bracket 50 extends between a gap 60 formed between the beam sections 20a, 20b. The bracket 50 is positioned below the beam 29 and does not contact against the object. The beam sections 20a, 20b are pivotally connected to the bracket 50. The beam sections 20a, 20b fold inward from the open orientation to the closed orientation. In the closed orientation, the bracket 50 is positioned at and end of the beam sections 20a, 20b. The bracket 50 can be positioned between the legs 30a, 30b in the closed orientation to protect the bracket 50 and provide for the stabilizer 10 to have a small overall size.

For purposes of description, the components of the first assembly 11 will be described. Because of the symmetrical configuration, the same description applies to the components of the second assembly 12.

The first beam section 20a includes an elongated shape that extends between an inner end 21a and an outer end 22a. A top side 23a is configured to contact against and support the object. In one example as illustrated in FIG. 1, the top side 23 is flat with a solid surface across the length and width. The first beam section 20a also includes one or more ribs 24a that extend along the bottom. The ribs 24a can be positioned at various locations across the width.

The first beam section 20a is pivotally attached to the leg 30a. A fastener 90a extends through apertures in the ribs 24a and in the leg 30a to attach the first beam section 20a to the leg 30a. The leg 30a is attached to pivot about the fastener 90a without the top end of the leg 30a contacting against the underside of the top side 23a. In one example, the ribs 24a are spaced apart a distance to receive the leg 30a in the closed orientation with the distance between the ribs 24a greater than a width of the leg 30a to provide for this folded configuration. The leg 30a can be configured to prevent inward pivoting beyond a predetermined point. In one example, the leg 30a is preventing from pivoting underneath the beam section 20a beyond perpendicular. A pin or flange can be positioned on the bottom of the first beam section 20a to contact against the leg 30a and control the extent of pivoting movement.

The leg 30a includes a first end 31a positioned at the first beam section 20a and an opposing second end 32a configured to contact against the floor 200 in the open orientation. The length of the leg 30a measured between the first and second ends 31a, 32a can vary depending upon the desired height of the first beam section 20a.

In one example, the leg 30a is a single unitary piece. In another example, the leg 30a is formed from two or more sections that are mounted together in a telescoping manner. FIG. 1 illustrates the leg 30a formed from a first member 33a and a second member 34a. The first member 33a includes a hollow interior sized to receive the second member 34a. In one example, each of the first and second members 33a, 34a includes the same sectional shape with the outer dimensions of the second member 34a slightly smaller than the inner dimensions of the first member 33a to provide for a relatively tight fit when the members 33a, 34a are overlapping. In one example, each of the members 33a, 34a include apertures spaced apart along their lengths. The members 33a, 34a can be longitudinally aligned and one or more fasteners inserted through the aligned apertures to secure the length.

In one example, the second end 32a is exposed to directly contact against the floor 200. A bumper or other like element may be attached at the second end 32a to facilitate the engagement and prevent the leg from sliding along the floor 200 when supporting an object. The second end 32a can also include a foot 40a. The foot 40a is pivotally mounted to the leg 31a and includes a bottom side 41a that contacts against the ground 200. The bottom side 41a can be smooth or can include surface configurations such as but not limited to treads, knurling, and teeth to facilitate gripping and prevent sliding along the floor 200. The foot 40a is pivotally connected to the leg 30a to provide for the bottom side 41a to be fully in contact with the ground 200. In one example as illustrated in FIG. 1, a fastener 91a extends through the leg 30a and foot 40a to provide for the pivoting connection. The pivoting connection also provides for the foot 40a to fold against the leg 30a in the closed orientation as illustrated in FIG. 2.

Figure 3:
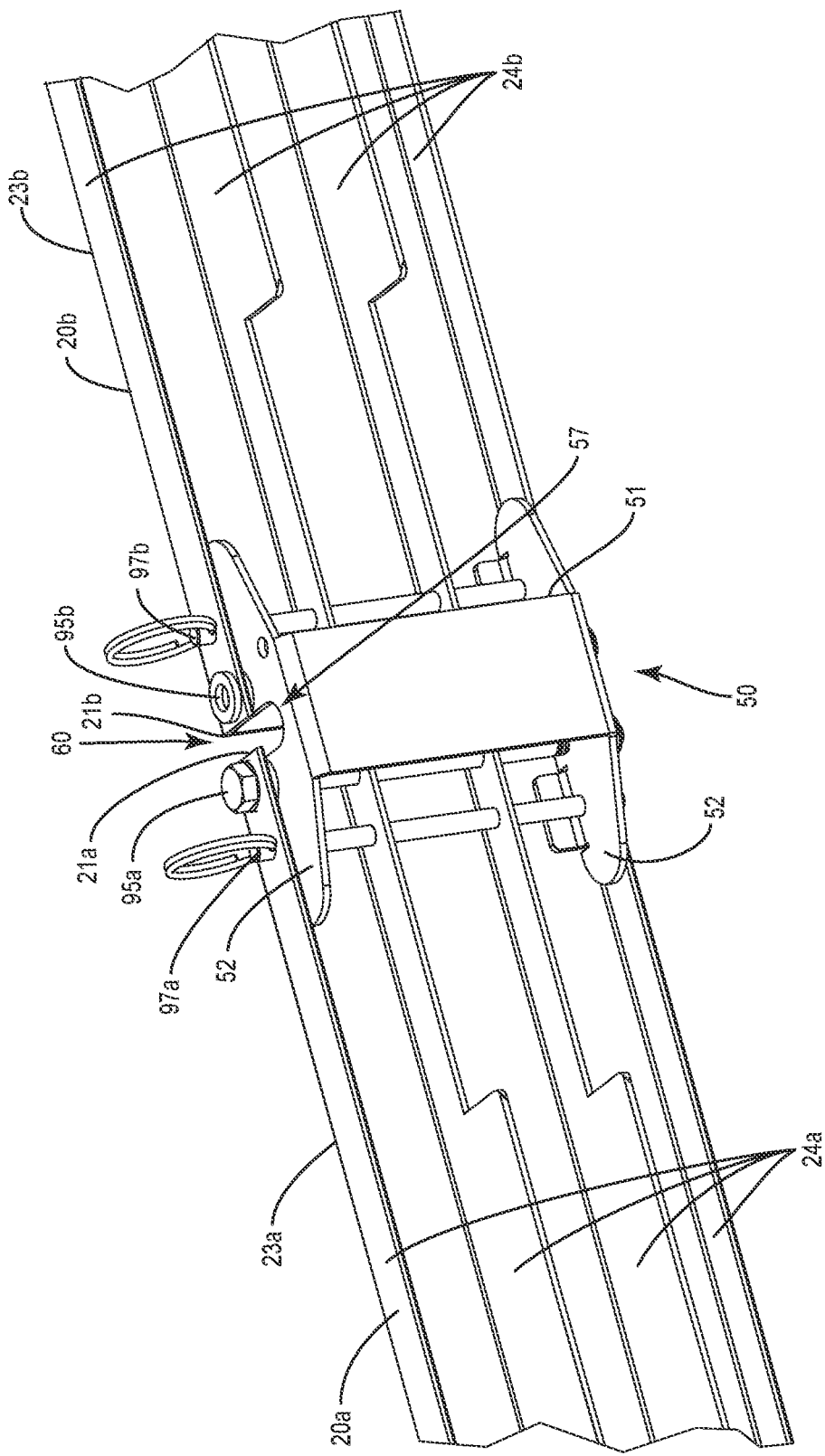
FIG. 3 is a perspective view of a bracket connected to bottom sides of first and second beam sections.
Figure 4:
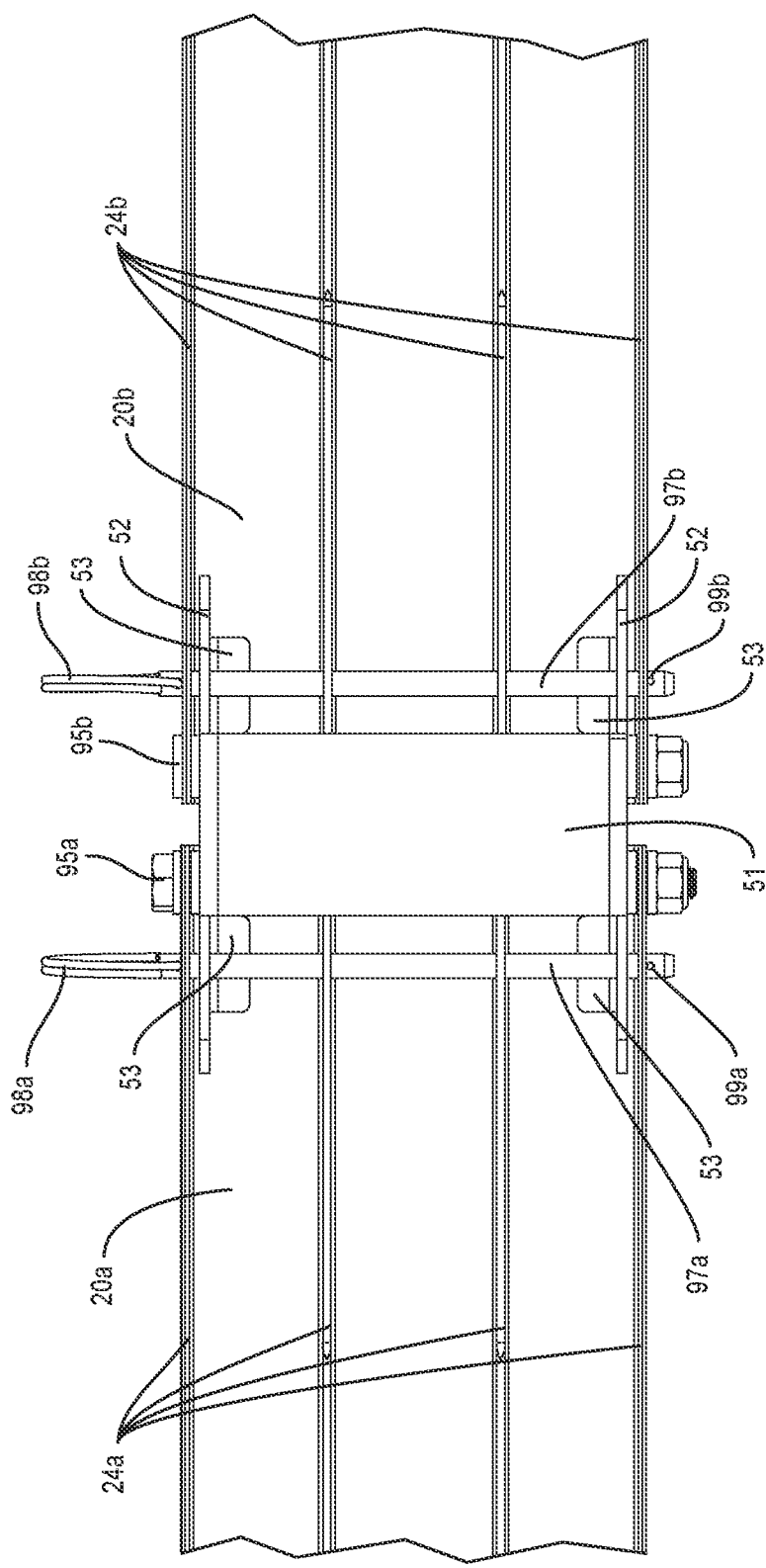
FIG. 4 is a bottom view of a bracket connected to bottom sides of first and second beam sections.

The bracket 50 connects together the first and second beam sections 20a, 20b. As illustrated in FIGS. 3 and 4, the bracket 50 includes a body 51 and a pair of wings 52. The body 51 is sized to extend across the width of the beam sections 20a, 20b. The body 51 is aligned with a gap 60 that is formed between the inner ends 21a, 21b of the beam sections 20a, 20b in the open orientation. The wings 52 extend along ribs 24a, 24b on the underside of the beam sections 20a, 20b. The fasteners 95a, 95b extend through the ribs 24a, 24b and wings to connect the bracket 50 to the beam sections 20a, 20b. The fasteners 95a, 95b are configured to provide for the pivoting movement of the beam sections 20a, 20b relative to the bracket 50 to move between the open and closed orientations. The fasteners 95a, 95b can include a variety of different mechanical types, including but not limited to a bolt/nut combination and a rivet. The bracket 50 is positioned underneath the beam sections 20a, 20b in the open orientation. This prevents the bracket from directly contacting the object that is positioned on the top sides 23a, 23b of the beam sections 20a, 20b.

Fasteners 97a, 97b can further secure the beam sections 20a, 20b to the bracket 50 in the open orientation. Additional apertures extend through the ribs 24a, 24b and wings 52 to receive the fasteners 97a, 97b when the beam sections 20a, 20b are in the open orientation. In one example as illustrated in FIGS. 3 and 4, the fasteners 97a, 97b are positioned towards a center of the beam sections 20a, 20b and away from the inner ends 21a, 21b a greater distance than the fasteners 95a, 95b. In one example, the fasteners 97a, 97b include pins with a handle 98 on a first end and a biased detent 99 at an opposing end.

The bracket 50 further includes flanges 53 that extend outward from the wings 52 as illustrated in FIG. 4. In one example, the flanges 53 are perpendicular to the wings 52. The flanges 53 contact against the bottom sides of the beam sections 20a, 20b to control and extent of movement of the beam sections 20a, 20b in the open orientation. The flanges 53 are positioned such that when contacted by the bottom sides, the beam sections 20a, 20b, are aligned in an end-to-end alignment in the open orientation. Further, the apertures in the beam sections 20a, 20b align to allow for a user to insert the fasteners 97a, 97b to secure the stabilizer 10 in the open orientation. In one example, the top sides 23a, 23b of the beam sections 20a, 20b are aligned in a common plane in the open orientation. The flanges 53 are positioned to contact the bottom sides of the beam sections 20a, 20b away from the ribs 24a, 24b.

The bracket 50 further positions the beam sections 20a, 20b apart in the open orientation. As illustrated in FIGS. 1 and 3, a gap 60 is formed between the inner ends 21a, 21b. The body 51 of the bracket 50 is aligned at the gap 60. In one example, the body 51 is centered at the gap 60 such that a center plane A divides the bracket 51 into equal halves. In one example, a distance between an axis of the fasteners 95a, 95b and the center plane is 0.35". In one example, the center plane A is perpendicular to the top sides 23a, 23b of the beam sections 20a, 20b when the stabilizer 10 is in the open orientation.

The bracket 50 further includes cutouts 57 at each of the wings 52 as illustrated in FIG. 3. The cutouts 57 receive the inner ends 21a, 21b when the beam sections 20a, 20b pivot to the closed orientation. The cutouts 57 allow for the beam sections 20a, 20b to fully pivot. In the closed orientation, the inner ends 21a, 21b and the outer ribs 24a, 24b of the beam sections 20a, 20b extend not the cutouts 57.

The two-piece structure of the beam 29 formed by the two beam sections 20a, 20b has advantages over a single-piece structure. The two beam sections 20a, 20b have a shorter length than a single-piece beam and thus peak deformation is decreased at the center of the beam 29. In one example, the amount of deformation of the two beam sections 20a, 20b is half that of a single-piece beam when used in the same context.

In use, the stabilizer 10 is in a closed orientation as illustrated in FIG. 2. This includes the beam sections 20a, 20b and legs 30a, 30b folded together. In one example, a centerline C/L1 of the first beam section 20a is parallel with a centerline C/L of the second beam section 20b. Centerlines of the legs 30a, 30b can also be parallel in the closed orientation. In one example as illustrated in FIG. 2, a gap 68 is formed between the top sides 23a, 23b of the beam sections 20a, 20b in the closed orientation. In another example, the top sides 23a, 23b contact together in the closed orientation.

The stabilizer 10 is unfolded from the closed orientation to the open orientation. The beam section 20a is pivoted about the fastener 95a as shown by arrow X. Likewise, beam section 20b is pivoted about fastener 95b as shown by arrow Y. The leg 30a is pivoted about fastener 90a away from the beam section 20a and leg 30b is pivoted about fastener 90b.

The first beam section 20a is pivoted until the bottom side contacts against the flanges 53 on the bracket 50. The second beam section 20b is also pivoted until the bottom side contacts the other flanges 53. Fastener 97a is inserted through the first beam section 20a to secure the position and fastener 97b is inserted through the second beam section 20b to secure the position. This positions the beams sections 20a, 20b in an end-to-end alignment and secured in position to the bracket 50. In the open orientation, the beam sections 20a, 20b are spaced apart by a gap 60. The top sides 23a, 23b can also be aligned in a common plane.

Figure 5:
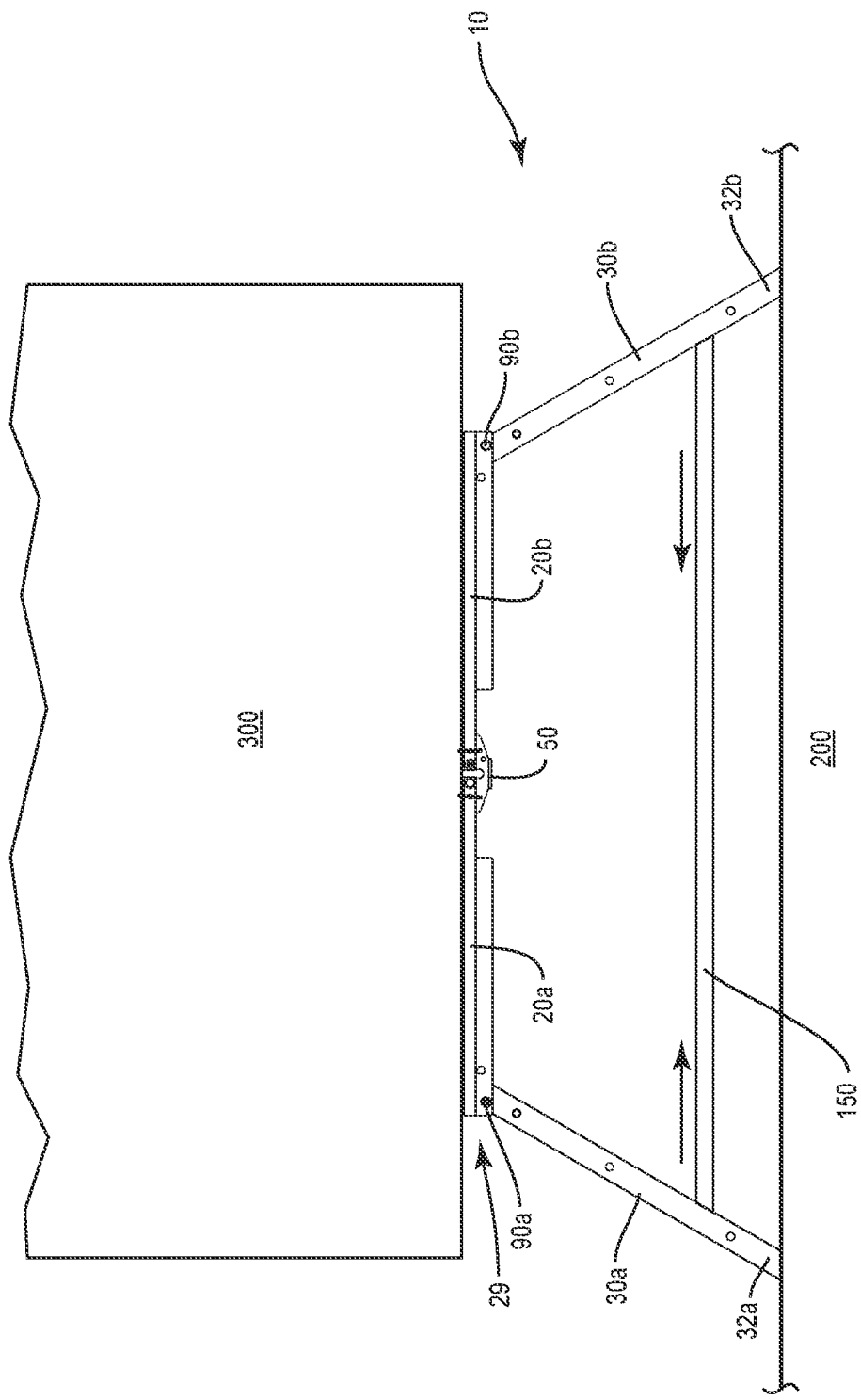
FIG. 5 is a side view of a stabilizer in an open orientation and supporting an object.

The stabilizer 10 is positioned underneath an object 300 as illustrated schematically in FIG. 5. The beam sections 20a, 20b are positioned against the object 300 and the second ends 32a, 32b of the legs 30a, 30b are positioned in contact with the floor 200.

Once positioned underneath the object 300, the legs 30a, 30b are pivoted inward to secure the stabilizer 10. The pivoting movement can be caused by a connector 150 that is attached to each of the legs 30a, 30b. The connector 150 applies an inward force to one or both legs 30a, 30b causing one or both to pivot about their respective fastener 90a, 90b. This pivoting movement raises a height of the beam 29 above the floor 200 and secures the stabilizer 10 underneath the object 300. The connector 150 can be secured to prevent the legs 30a, 30b from pivoting outward.

In one example, the connector 150 is a belt with a ratcheting mechanism to apply the inward force to the legs 30a, 30b. The connector 150 can also include various other items, such as but not limited to a rope and a belt. In another example, a force is applied to the outer side of one or both of the legs 30a, 30b to secure the stabilizer 10 is position.

Figure 6:
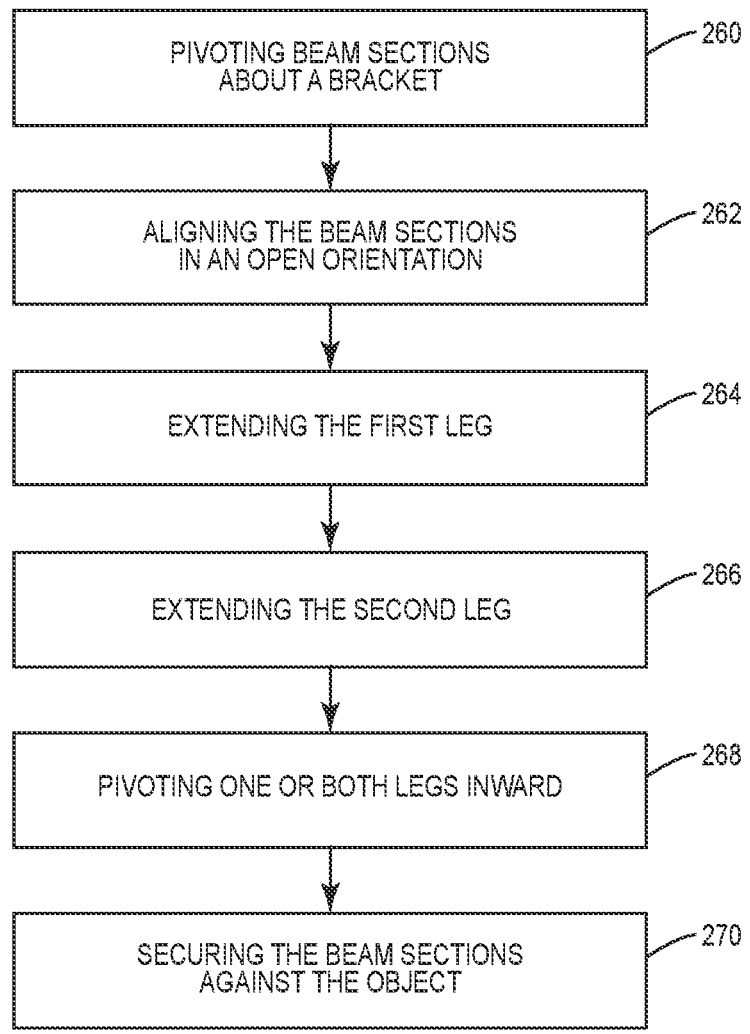
FIG. 6 is a flowchart diagram of a method of supporting an object above a floor with a stabilizer.

FIG. 6 illustrates a method of using a stabilizer 10 to support an object 300. The method includes pivoting a first beam section 20a relative to a second beam section 20b about a bracket 50 that is connected to inner ends 21a, 21b of each of the first beam section 20a and the second beam section 20b (block 260). The beam sections 20a, 20b are aligned in an open orientation with an end-to-end alignment with the bracket 50 at a central point between the beam sections 20a, 20b (block 262). The first leg 30a is extended outward from the first beam section 20a (block 264). The second leg 30b is extended outward from the second beam section 20b (block 266). One or both of the legs 30a, 30b are pivoted inward (block 268). This simultaneously contacts each of the beam sections 20a 20b against the object 300 (block 270).

After the stabilizer 10 is no longer needed to support the object 300, the stabilizer can be removed and folded into the closed orientation. This includes pivoting one or both of the legs outward and moving the beam 29 away from the object 300. The stabilizer 10 can be removed from underneath the object. The first leg 30a is folded against the first beam section 20a and the second leg 30b is folded against the second beam section 20b. The two folded sections can then be further folded together about the bracket 50 to the closed orientation. The closed orientation has a relatively small size to facilitate storing the stabilizer 10.

The stabilizer 10 can be used to support a variety of different objects. One example includes various recreational vehicles, such as RVs, campers, and trailers. Other examples include but are not limited to cars, trucks, boats, and houses.

The components of the stabilizer 10 can be made from a variety of different materials. Examples include but are not limited to aluminum, steel, and plastics. In one example, the beam sections 20a, 20b is formed by an extrusion process.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A stabilizer to support an object above a floor, the stabilizer comprising:
   a bracket;
   a first beam section comprising an inner end, an outer end, a top side, and a bottom side, the first beam section connected to a first side of the bracket at the inner end of the first beam section;
   a second beam section comprising an inner end, an outer end, a top side, and a bottom side, the second beam section connected to a second side of the bracket at the inner end of the second beam section;
   a first leg connected to the first beam section at the outer end of the first beam section;
   a second leg connected to the second beam section at the outer end of the second beam section;
   the first beam section and the second beam section pivotally connected to the bracket and movable between an open orientation and a closed orientation;
   the open orientation comprising the first beam section and the second beam section aligned in an end-to-end alignment and with the inner ends spaced apart by a gap;
   the closed orientation comprising the first and second beam sections folded together about the bracket with the top side of the first beam section and the top side of the second beam section facing together and the bottom side of the first beam section and the bottom side of the second beam section facing outward; and
   wherein the bracket comprises cutouts along a bottom side and the inner end of the first beam section and the inner end of the second beam section are aligned with the cutouts in the closed orientation.

2. The stabilizer of claim 1, wherein the stabilizer is symmetrical about a center plane that extends through the bracket and is perpendicular to the top sides of the first and second beam sections in the open orientation.

3. The stabilizer of claim 1, wherein the first beam section and the second beam section are identical in shape and size.

4. The stabilizer of claim 1, wherein the bracket comprises a central body that is aligned with the gap and wings that extend outward from the central body and are connected to each of the first beam section and the second beam section.

5. The stabilizer of claim 1, wherein the top sides of the first beam section and the second beam section are aligned in a common plane in the open orientation.

6. A stabilizer to support an object above a floor, the stabilizer comprising:
   a first section and a second section each comprising:
      a beam section comprising an inner end, an opposing outer end, a top side, and
      a bottom side;
      a leg pivotally connected at the bottom side of the beam section in proximity to the outer end;
   a bracket connected at the bottom side of each of the beam sections at the inner ends, the bracket comprising a central body at the inner ends and wings that connect to each of the beam sections;
   the first and second sections configured to move between an open orientation and a closed orientation;
   the open orientation comprising the beam sections positioned in an end-to-end alignment with the top sides aligned in a plane and with the legs extending from the bottom sides away from the beam sections;
   the closed orientation comprising the beam section and the leg of the first section folded together and the beam section and the leg of the second section folded together and with the first and second sections folded together about the bracket and with the top sides parallel;
   wherein each of the first and second beam sections comprise ribs on the bottom side with the ribs extending along a length of the beam sections between the first ends and the second ends; and
   wherein the wings of the bracket are connected to the ribs of the beam sections and with the wings positioned away from the top sides.

7. The stabilizer of claim 6, wherein in the open orientation the bracket spaces apart the inner ends of the beam sections by a gap.

8. The stabilizer of claim 7, wherein the first and second sections are symmetrical about a center plane that extends through the gap when the first and second sections are in the open orientation.

9. The stabilizer of claim 6, wherein the legs are connected to the beam sections at the ribs and are positioned away from the top sides to provide for the first and second sections to pivot between the open and closed orientations.

10. The stabilizer of claim 6, wherein the ribs extend an entirety of the length of the beam sections.

11. The stabilizer of claim 6, wherein each of the first and second sections further comprising a foot pivotally connected to the leg with the foot of the first section is pivotally connected to the leg of the first section and the foot of the second section is pivotally connected to the leg of the second section and with the feet folded inward against the legs in the closed orientation.

12. The stabilizer of claim 6, wherein the bracket is positioned an equal distance from each of the legs.

13. The stabilizer of claim 1, wherein the inner end of the first beam section and the inner end of the second beam section face together in the open orientation.

14. The stabilizer of claim 1, further comprising:
openings in the bracket, the first beam section, and the second beam section;
a first pin;
a second pin;
wherein a first set of the openings in the bracket and the first beam section align and the first pin is sized to extend through the first set of openings in the open orientation; and
wherein a second set of the openings in the bracket and the second beam section align and the second pin is sized to extend through the second set of openings in the open orientation.

15. A stabilizer to support an object above a floor, the stabilizer comprising:
a first beam section and a second beam section each comprising:
a C-shaped cross section with a central section and first and second side walls;
an elongated shape with an inner end and an outer end;
a pair of openings that extend through the side walls at the inner end;
a bracket pivotally connected to each of the first beam section and the second beam section, the bracket comprising:
a body;
one or more first openings on a first side of the body;
one or more second openings on a second side of the body;
a first leg pivotally connected to the first beam section at the outer end;
a second leg pivotally connected to the second beam section at the outer end;
a first pin;
a second pin;
the stabilizer configured to be positioned in an open orientation and a closed orientation;
the open orientation comprising:
the inner ends of the first and second beam sections facing together and the central sections being substantially aligned in a common plane;
the pair of openings in the first beam section aligned with the one or more first openings in the bracket to receive the first pin;
the pair of openings in the second beam section aligned with the one or more second openings in the bracket to receive the second pin;
the closed orientation comprising:
the first beam section and the second beam section pivoted apart;
the pair of openings in the first beam section misaligned from the one or more first openings in the bracket; and
the pair of openings in the second beam section misaligned from the one or more second openings in the bracket.

16. The stabilizer of claim 15, wherein the body of the bracket comprises:
a central body with a first wing on a first side of the central body and a second wing on a second side of the central body; and
the one or more first openings positioned on the first wing and the one or more second openings positioned on the second wing with the first pin and the second pin spaced apart in the open orientation.

17. The stabilizer of claim 16, wherein the bracket comprises cutouts along the central body and between the first wing and the second wing, wherein the inner end of the first beam section and the inner end of the second beam section are aligned with the cutouts in the closed orientation.

18. The stabilizer of claim 15, wherein in the closed orientation the first leg is folded into the first beam section and the second leg is folded into the second beam section.

* * * * *